No. 790,336.

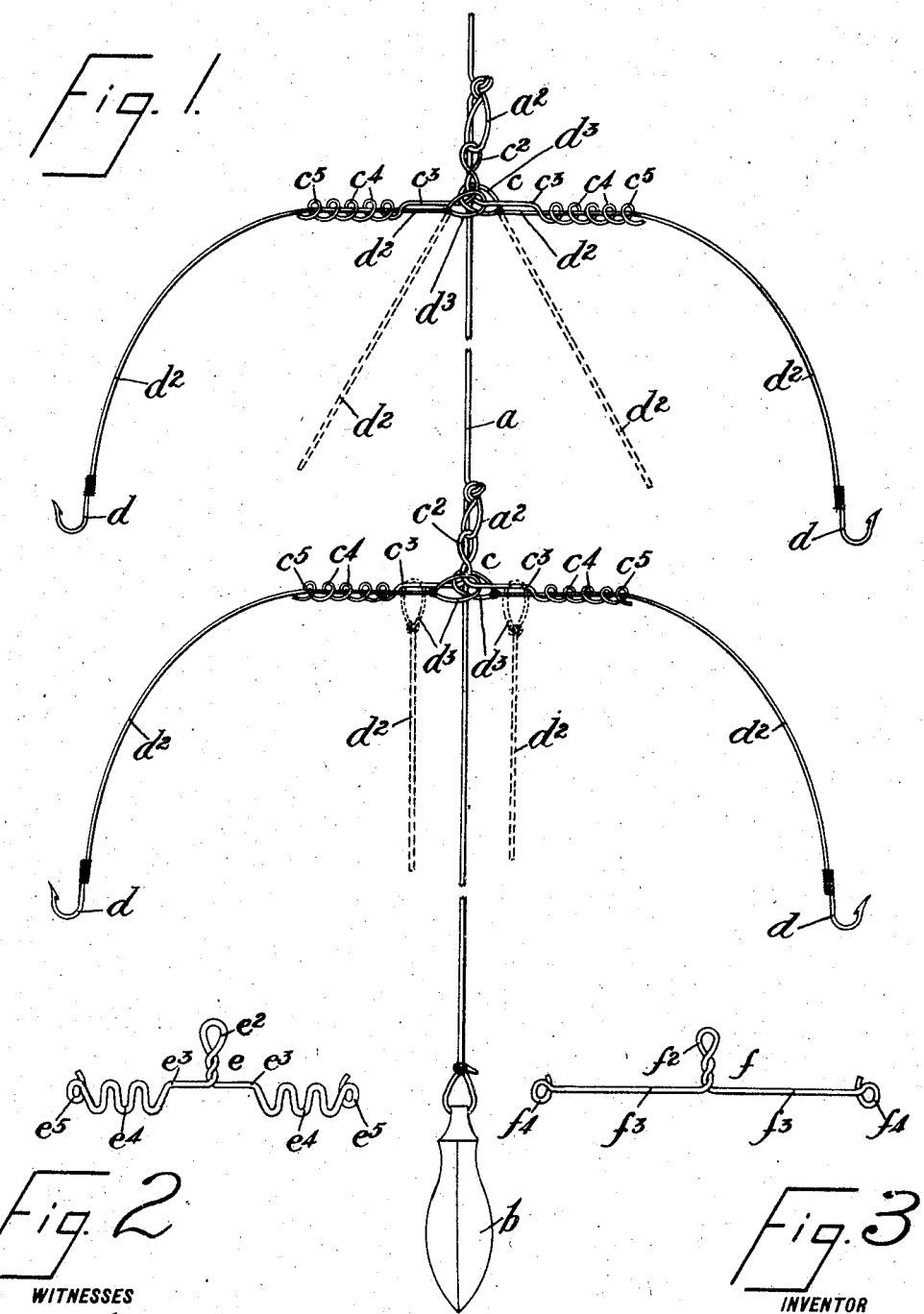

Patented May 23, 1905.

UNITED STATES PATENT OFFICE.

GEORGE YOERGER, OF BROOKLYN, NEW YORK.

SNELL ATTACHMENT FOR FISH-LINES.

SPECIFICATION forming part of Letters Patent No. 790,336, dated May 23, 1905.

Application filed August 11, 1904. Serial No. 220,359.

*To all whom it may concern:*

Be it known that I, GEORGE YOERGER, a citizen of the United States, residing at Brooklyn, in the county of Kings and State of New York, have invented certain new and useful Improvements in Snell Attachments for Fish-Lines, of which the following is a specification, such as will enable those skilled in the art to which it appertains to make and use the same.

This invention relates to means for attaching hooks to fish-lines, and particularly for attaching hooks provided with the usual or ordinary snell; and the object of the invention is to provide an improved device of this class whereby a number of hooks may be secured to a line in such manner that they will not become tangled or interfere one with another.

The invention is fully disclosed in the following specification, of which the accompanying drawings form a part, in which the separate parts of my improvement are designated by suitable reference characters in each of the views, and in which—

Figure 1 is a view showing two of my improved attaching devices connected with a single line; Fig. 2, a side view of a modified form of an attaching device, and Fig. 3 a similar view showing another modification.

In the drawings forming part of this specification I have shown at $a$ an ordinary fish-line provided with a sinker $b$, and in the practice of my invention, as shown in Fig. 1, I provide a snell-attaching device $c$, two of which are shown connected with the line in Fig. 1. The snell-attaching device $c$ is made of spring-wire bent centrally to form a loop $c^2$ and two oppositely-directed arms $c^3$, and in practice the loop $c^2$ is provided with a twisted shank. The arms $c^3$, as shown in Fig. 1, are formed into spiral coils $c^4$, and the last coil at the end of each arm forms or is formed into an open ring or eye $c^5$, and in practice the loop $c^2$ of the attaching device is secured in a bow or loop $a^2$, formed in the line $a$, or said loop $c^2$ may be connected with the line $a$ at any desired point in any preferred way. I have also shown in Fig. 1 four hooks $d$, each of which is provided with a snell $d^2$, composed of catgut or similar material, said material being elastic and possessing more or less stiffness and resiliency. The snells $d^2$ are provided at the ends thereof opposite the hooks $d$ with a loop $d^3$, and in practice the loops of the snells are passed on over the opposite arms $c^3$ of the attaching device, as shown at the bottom of Fig. 1. The snell $d^2$ on one of the arms $c^3$ is then carried around and threaded through the coils $c^4$ of the opposite arm $c^3$, while the snell $d^2$ on the other arm $c^3$ is carried around and threaded through the coils $c^4$ of the opposite arm $c^3$, this operation of threading being performed by simply winding the snells around said coils, and the result of this operation is to pass the snells through said coils, as clearly shown in Fig. 1, and when the fastening devices are connected with the line and the snells connected with the fastening devices in the manner described the hooks $d$ will be held separate and apart, as shown in said figure, and will not become tangled together in the operation of fishing, and any number of hooks may thus be suspended from or connected with a line.

In Fig. 2 I have shown a modification of the attaching device in which said device is also composed of spring-wire, said device being designated by the reference character $e$, and in forming this attaching device the wire is bent centrally to form a loop $e^2$, which is substantially the same as the loop $c^2$ in Fig. 1, and the opposite end portions of the wire are bent to form two arms $e^3$, which are formed into loops or undulations $e^4$, the loops or undulations $e^4$ of each arm being all in the same plane and not constituting spirals, and the end of each arm is also formed into an open ring or eye $e^5$. It will be observed that the only difference between the attaching device shown in Fig. 1 and that shown in Fig. 2 is in the fact that the loops or undulations $e^4$ shown in Fig. 2 are not spirals, and the operation of attaching the snells $d^2$ to the form of attaching device shown in Fig. 2 is substantially the same as that hereinbefore described with reference to Fig. 1, the loops of the snells being passed on over the arms $e^3$ and the snell on one arm being then carried around and wrapped around the opposite arm and passed into the open eye or ring $e^5$ and the opposite snell being similarly operated.

In Fig. 3 I have shown another modification of the attaching device, and in this figure the attaching device is designated by the reference character $f$. This attaching device is also formed of spring-wire bent centrally to form a loop $f^2$ and two arms $f^3$, each of which is provided at its outer end with an open eye or ring $f^4$, and in practice the loops of the snells are passed over the arms $f^3$ in the same manner as with the construction shown in Fig. 1. The snell on one arm is then carried around to the other arm and wrapped around said arm and passed into the open ring or eye $f^4$ at the end thereof, and the other snell is similarly connected with the other arm, and in all the forms of construction shown it will be observed that the snell which is passed on over one arm is carried around and wrapped around the other arm in the operation of attaching the snells as herein described, and this holds the snells in connection with said arms, the loops $d^3$ being held in connection with the shanks of the loops $c^2$, $e^2$, or $f^2$, according to the form of attaching device employed.

Having fully described my invention, what I claim as new, and desire to secure by Letters Patent, is—

1. The herein-described device for attaching the snells of fish-hooks to a fish-line, said snells being provided at their ends with loops, said device comprising a central loop member and arms projecting therefrom in opposite directions, said arms being provided at their ends with open eyes or rings, the loops of the snells being adapted to be passed on over said arms and to be wound around said arms in opposite directions and passed into said eyes or rings, substantially as shown and described.

2. The herein-described means for connecting the snells of fish-hooks with a fish-line, comprising radially-arranged arms connected at their adjacent ends and provided at the point of connection with a loop which extends at an angle therefrom, said arms being formed into spirals or convolutions, substantially as shown and described.

3. The herein-described means for connecting the snells of fish-hooks with a fish-line, comprising radially-arranged arms connected at their adjacent ends and provided at the point of connection with a loop which extends at an angle therefrom said arms being formed into spirals or convolutions, and provided at their ends with open eyes or rings, substantially as shown and described.

In testimony that I claim the foregoing as my invention I have signed my name, in presence of the subscribing witnesses, this 10th day of August, 1904.

GEORGE YOERGER.

Witnesses:
C. E. MULREANY,
C. J. KLEIN.